Nov. 8, 1932.   W. F. SCHACHT ET AL   1,887,436
CASTER ROLLER
Filed Feb. 5, 1930
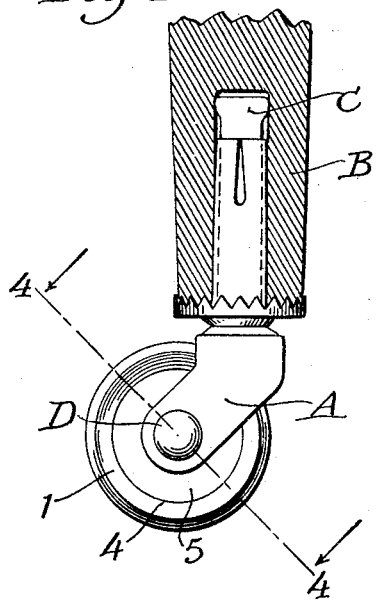
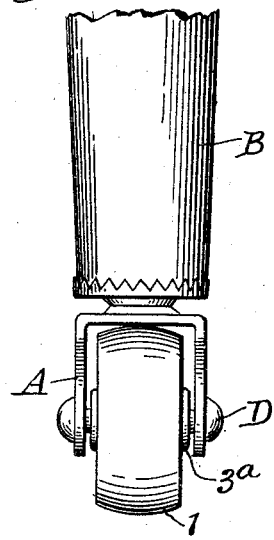
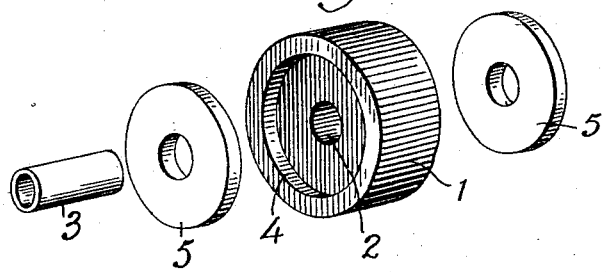
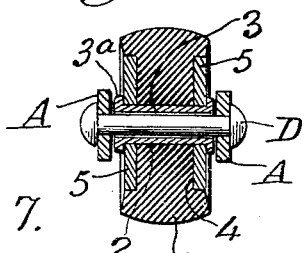
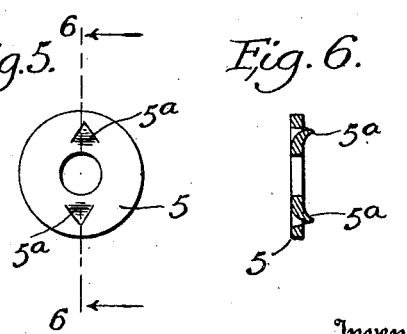
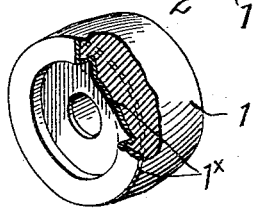
Inventors
William F. Schacht
and Sim E. Schacht
By Alexander & Dowell
Attorneys Patented Nov. 8, 1932

1,887,436

UNITED STATES PATENT OFFICE

WILLIAM F. SCHACHT AND SIM E. SCHACHT, OF HUNTINGTON, INDIANA

CASTER ROLLER

Application filed February 5, 1930. Serial No. 426,081.

Our invention is a novel improvement in wheels or rollers, particularly for use in casters of various kind for articles of furniture, and the principal object of the invention is to provide a wheel or roller consisting almost entirely of rubber, means being also provided for preventing distortion of the rubber body and for effecting a camber or crown at the periphery of the rubber roller.

Heretofore caster wheels or rollers have been made of wood, metal, fibre or felt, with or without relatively thin rubber tires; but all of the above caster wheels have proved entirely unsatisfactory because caster wheels having relatively hard peripheries will scratch, mar, or mark polished floors; and are very noisy in operation. Also, the roller pins soon wear away the softer bores of the felt or fibre rollers and the rollers cease to function properly in the casters.

Our improved caster roller or wheel is designed for simplicity, economy, and efficiency, and briefly comprises a cylindrical rubber body provided with means for holding the body against distortion by the weight of the furniture, the component parts of the roller or wheel being locked together during a single manufacturing step; and our improved rubber caster wheel will not scratch, mar, or mark the floor, and moreover is entirely noiseless in operation; and is provided with a metal bushing for receiving the pin of the caster frame to prevent wearing away of the bore of the roller.

Other minor objects of the invention will be hereinafter set forth.

We will explain the invention with reference to the accompanying drawing which illustrates several practical embodiments thereof to enable others to adopt and use the same; and will summarize in the claims the novel features of construction, and novel combinations of parts, for which protection is desired.

In said drawing:

Fig. 1 is a side elevation of a caster of usual type provided with our novel caster wheel, and applied to the leg of an article of furniture shown in section.

Fig. 2 is an end elevation thereof.

Fig. 3 is an expanded perspective view of the parts constituting the wheel.

Fig. 4 is a transverse section through the wheel and caster on the line 4—4 Fig. 1.

Fig. 5 is a plan view of a modified form of washer.

Fig. 6 is a section on the line 6—6, Fig. 5.

Fig. 7 is a perspective view of a modified form of roller.

As shown the fork-shaped holder A of the caster may be applied to a leg B of an article of furniture by the usual plug C as shown in Fig. 1, or the plug may be replaced by other means, the particular type of caster being immaterial and forming no part of our present invention.

Our invention consists in providing an all-rubber caster wheel for the caster, which wheel as shown in Figs. 3 and 4 consists of a body portion 1 of medium rubber and of cylindrical shape, the body having a substantial length. In the body 1 is an axial bore 2 adapted to snugly receive a hollow metallic bushing 3 of slightly greater length than that of the body 1. In each end of body 1, coaxial with bore 2, is a shallow circular recess 4 of somewhat smaller diameter than that of body 1, the recesses 4 being each adapted to receive a metallic washer 5 of diameter and depth or thickness to suit the recess. Washers 5 are provided with central openings adapted to snugly receive the ends of bushing 3. If desired the washers may be flat or plain as in Fig. 3; or may be provided with prongs or projections 5a formed on their inner surfaces by pressing out tongues from the body of the washer as shown in Figs. 5 and 6, which projections 5a will stick into the rubber of body portion 1 and prevent washers 5 from rotating in their recesses. The projections 5a (Fig. 6) on the washers 5 may be formed in any other desired manner. The plain or flat disks 5 may be used on small rollers or wheels, but on larger rollers or wheels it may be found desirable to use some form of means such as the sharp projections 5a to prevent the disks from rotating in their recesses.

After the washers 5 have been placed in their respective recesses 4 and the bushing 3 inserted through the bore 2 of body 1 and through the washers 5, the ends of the bushing 3 are then spun outwardly as at 3a (Fig. 4) over the outer faces of washers 5, thereby compressing the central portion of the rubber body to form a hard central mass, causing the outer periphery of the roller to assume the desired bowed or cambered shape clearly indicated in Figs. 2 and 4. The washers 5 fitting snugly in the recesses 4 form a solid support for the sides of the rubber body 1 and prevent the body of the roller from being distorted out of circular shape under pressure of the weight of the furniture. When under compression therefore our novel rubber wheel will act substantially as a solid wheel owing to the metal washers 5, and to the metal bushing 3; and as the periphery of the wheel is of medium rubber it will not scratch or mar a polished floor, and the wheel will be noiseless when passing over the floor; and the metal bushing 3 will prevent enlargement of the bore of the roller.

In Fig. 7 the rubber body of the roller is shown as slightly modified by having incorporated therein a cloth or wire fabric ply 1x molded to each side face of the roller, the fabric conforming with the recesses 4 and reinforcing the roller, and preventing the edges of the metal washers 5 from cutting the rubber. This form of roller, when made of medium rubber could have the periphery made flat as in Fig. 3, or could be molded or otherwise formed with a slight initial crown or camber, the compressing of the washers emphasizing or increasing the camber in the completed roller as above explained with reference to Fig. 4.

In making our novel roller, we first insert the metal bushing 3 through the bore 2 of the rubber body which snugly fits therein. Then the two disks 5 are placed in the recesses 4 at each side of the body and the assembled parts put in a punch press and the disks and body forcibly pressed together, and the ends of the bushing spun outwardly over the outer faces of the disks 5 as indicated in Fig. 4. The assembled wheels are then removed from the press and inserted in the frames of the various forms of casters, with the pins D which pierce the legs of the casters A passing through the metal bushings 3 of the rollers, as indicated in Figs. 1 and 4.

We do not limit our invention to use only in connection with casters, for obviously our wheels or rollers may be used in other devices for which they are adaptable, nor do we limit our invention to the exact forms shown in the drawing for obviously changes may be made therein within the scope of the claims.

We claim:

For a caster, a roller comprising a solid molded body of compressible rubber having a small axial bore and preformed shallow cylindrical recesses in its sides at opposite ends of the bore and of substantially less diameter than the body; metal washers of substantial thickness seated in and completely filling the said recesses, and having axial openings registering with the bore; and a tubular bushing closely fitted in and extending through the bore of the body and through the openings in the washers the ends of the bushing being flanged over the edges of the openings in the washers to hold the central portion of the body tightly compressed between the washers and around the core.

WILLIAM F. SCHACHT.
SIM E. SCHACHT.